Dec. 13, 1932.  F. G. L. BOYER  1,890,598
TRANSFER MACHINE
Filed Feb. 2, 1923  5 Sheets-Sheet 2

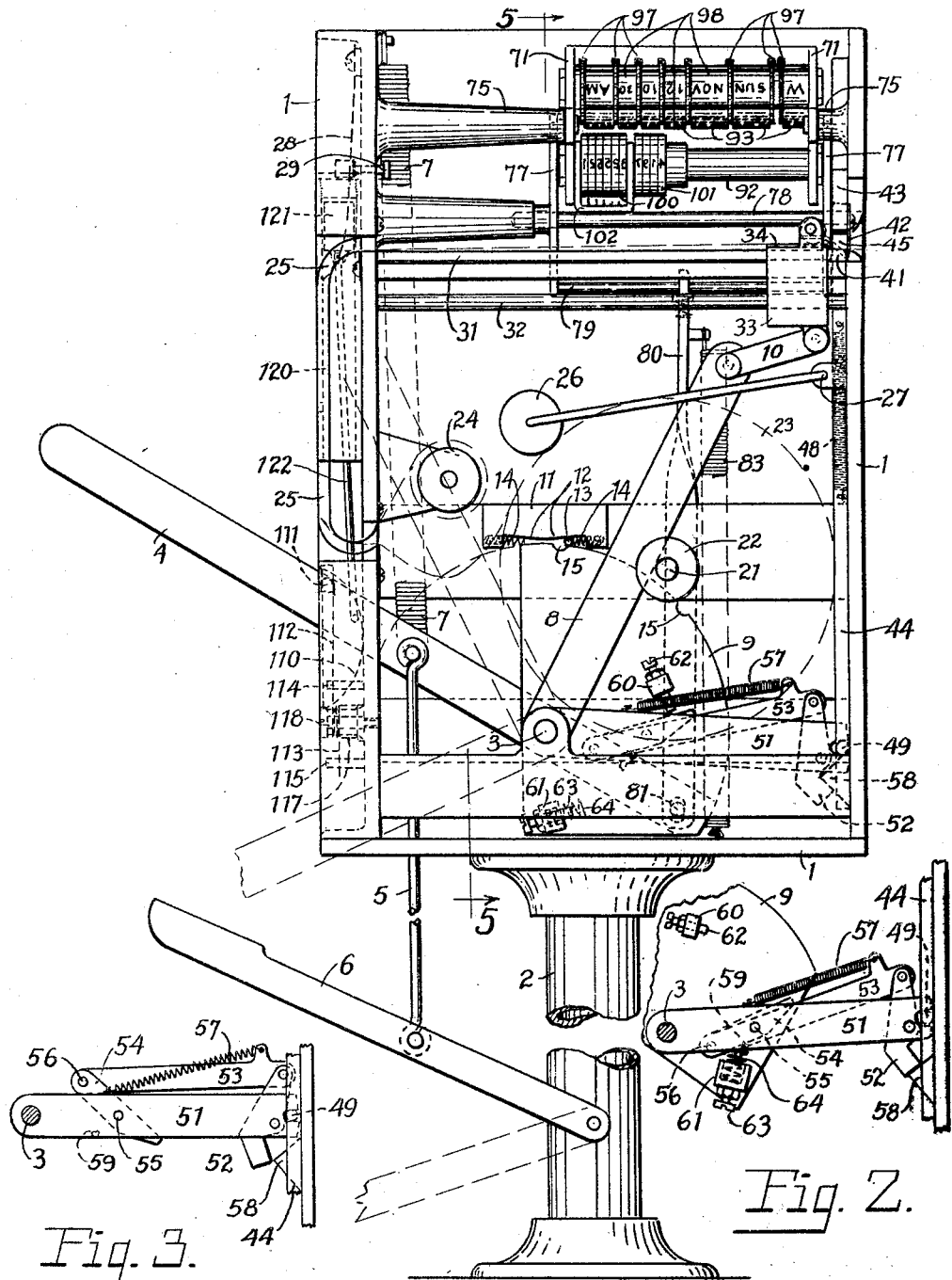

INVENTOR.
Frederick G. L. Boyer,
BY F. K. Fassett,
ATTORNEY.

Dec. 13, 1932.  F. G. L. BOYER  1,890,598
TRANSFER MACHINE
Filed Feb. 2, 1923  5 Sheets-Sheet 3

INVENTOR.
Frederick G. L. Boyer,
BY F. K. Fassett,
ATTORNEY.

Dec. 13, 1932.   F. G. L. BOYER   1,890,598
TRANSFER MACHINE
Filed Feb. 2, 1923   5 Sheets-Sheet 4

INVENTOR.
Frederick G. L. Boyer,
BY
F. K. Fassett
ATTORNEY.

Dec. 13, 1932. F. G. L. BOYER 1,890,598
TRANSFER MACHINE
Filed Feb. 2, 1923 5 Sheets-Sheet 5

INVENTOR,
Frederick G.L. Boyer,
BY F. K. Fassett
ATTORNEY.

Patented Dec. 13, 1932

1,890,598

UNITED STATES PATENT OFFICE

FREDERICK G. L. BOYER, OF DAYTON, OHIO

TRANSFER MACHINE

Application filed February 2, 1923. Serial No. 616,509.

My invention relates to machines for issuing transfer tickets on street cars, and has for its prime object the issuance of a transfer which shall plainly indicate the date and time of day and any other information desired, in characters so plain and conspicuous that they may be easily and quickly read by the conductor accepting them even in times of traffic congestion. A further object of the invention is to provide means for quickly and easily issuing transfers and thus preventing the congestion and delays incident to the punching and issuing of transfers by hand. Another object is to provide means for putting the supply of blanks into the machine in the form of a roll, and further means for inserting a new roll into the machine before the old roll is exhausted, and automatic means for attaching the beginning of the paper on the new roll to the end of that on the old roll when the old roll becomes exhausted, thus permitting a new roll to be inserted at any convenient time, and preventing delays in case the old roll should become exhausted during a rush hour. Other detailed objects of the invention will be made plain by reference to the accompanying specifications and claims.

In most transfers used at the present time the various possible months, dates, times, and other desired data are printed on the blanks issued to conductors; and the correct date, time, etc. are designated thereon by means of holes punched in the proper places. It requires time and care to properly punch these by hand, many errors are made due to the necessity for accurately locating the holes, and many delays are caused at times when traffic is heavy. Even if issued by a machine which would punch the desired holes automatically the disadvantages of this type of transfer are not overcome because in rush hours it is impossible for the person taking the transfers to look at each one closely enough to be certain of the date, time, and other data designated by the punch marks. This means that inevitably many transfers are fraudulently used, and the railways are subjected to considerable losses because of the lack of easily readable markings. Also the handling of the pad of transfers by the conductor, frequently licking his fingers to separate the blanks, is always unsanitary and may be a positive danger in some cases.

In order to overcome these disadvantages I have provided a machine which, at the simple pressure of the hand or foot of the operator, will issue a transfer which the passenger receives directly from the machine, and which therefore need never be touched by the conductor. I provide further that the single operation shall stamp on the transfer blank the day of the week, the month, the day of the month, and the time of day, together with any other data which may be desired, such as the direction of travel, etc. instead of merely designating one of a plurality of dates, times, etc. printed on the blank. I also provide that this information shall be printed in a color different from the other printing on the transfer and that the characters used shall be of such form and size as to be easily read even in the rush hours.

To permit the printing of the date, time, etc. in a color different from that of the other printing on the transfer without unduly complicating the machine, and to prevent any of the difficulties which would arise if an attempt were made to print all of the printing on the body of the transfer by means of a machine carried about on cars and with the lack of attention to which such machines are likely to be subjected, I have provided for the use of blanks in which all of the printing which is uniform on all transfers has already been done. For the sake of simplicity and economy I provide for these blanks being printed on strips of paper, and rolled into rolls containing, say, one thousand blanks each.

To permit the printing of the date, time, etc. in such bold faced type as to cause it to be more conspicuous and easy to read them is the other printing on the transfer I have found it advisable to abandon the ordinary inking ribbon and provide means for inking the type prior to the printing operation. The more elaborate systems of inking type, used on various forms of printing devices, are not such as to give uniformly satisfactory service when subjected to the dirt, vibration, and lack of care to which devices of this kind, which must be carried about on the cars and cared for by different operators, are liable. I therefore prefer to ink the type by means of a simple inking pad against which the type normally rest, and provide that the pad may be easily removed to be re-inked or replaced by a freshly inked pad.

In order that the characters stamped on the transfer by my machine shall register properly with the printing already on the blank I have holes punched in the strip between the blanks at the time the printing is being done. These holes control the feeding of the paper through my machine in a manner which will presently be described in detail.

The machine and its operation will be more readily understood by reference to the accompanying drawings in which:

Fig. 1 is a front elevation of the machine with the cabinet removed.

Fig. 2 is a detail showing the knife operating mechanism in the position which it occupies at the completion of the down stroke of the operating handle.

Fig. 3 is a detail showing the same mechanism in its intermediate position—a position in which it is never stationary, but is always moving with great rapidity.

*General arrangement*

Figures 4, 5:
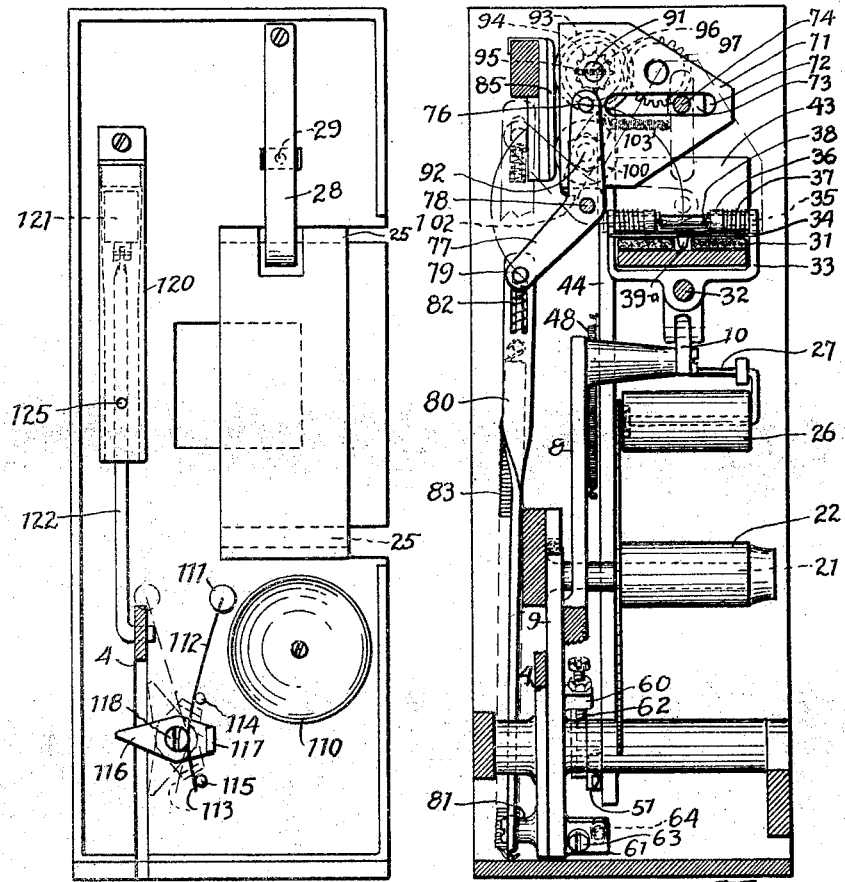
Fig. 4 is a left end elevation of the machine as a whole, with the cabinet and pedestal removed.
Fig. 5 is a section on the line 5—5 of Fig. 1.

Referring to Fig. 1. A suitable framework 1 is supported by any suitable pedestal or stand 2. Journalled in frame 1 is the main shaft 3. On this shaft is mounted the operating handle 4 which in turn is connected by means of connecting rod 5 to a treadle 6, in such a manner that either a pressure of the hand on handle 4 or of the foot on treadle 6 will operate the machine. Rigidly attached to and forming a part of handle 4 are an arm 8 and an arcuate member 9. To operate the machine handle 4 is depressed to the limit of its motion i. e. to the position shown by the broken lines in Fig. 1. The handle is then released and is returned to its original position by a spring 7.

*Full stroke device*

In order to compel the completion of each stroke before the next is begun a full stroke device is provided as follows: Mounted adjacent to arcuate member 9 is a block 11 having two plane or curved surfaces 12 such that one of the surfaces 12 and the curved surface of arcuate member 9 converge in one direction, and the other of the surfaces 12 and the curved surface of arcuate member 9 converge in the opposite direction. Mounted between one of the surfaces 12 and member 9 is a ball or roller 13 which is held into the angle between the converging surfaces by one of the springs 14, in such a manner that it will prevent the rotation of member 9 in one direction while allowing it in the other direction. During the return stroke of the handle these parts are in the position shown in Fig. 1, which allows a clockwise rotation of the arcuate member 9 and parts attached thereto. When the return stroke of the handle is completed the notch 15 in member 9 reaches such a point that spring 14 pushes roller 13 into it. At the beginning of the downward stroke of the handle 4, notch 15 carries roller 13 into contact with it the left hand surface 12. As the rotation proceeds notch 15 passes beyond roller 13 which will then prevent a backward movement of the handle until the other one of the two notches 15 releases the roller in the manner just described. On the return stroke the above process is repeated but in the opposite direction. In either case the direction of movement of the handle can not be reversed until the stroke is entirely completed.

*Paper feeding mechanism*

The method of feeding the paper through the machine will now be described. A shaft 21 secured to the frame of the machine supports a roller 22 which carries the paper roll 23 (Figs. 1 and 5). The position of paper roll 23 is merely indicated by broken lines in order that the mechanism behind it may not be obscured. The strip of paper from the roll runs up through slot 25 and over platen 31 and on out of the machine. Slot 25 is open towards the front of the machine so that the paper may be simply slipped in from the front and need not be threaded through any long passage. An idler roll 26 supported from a pivot 27; and a tension spring 28, (see Figs. 1 and 4) which may be lifted, to allow the easy insertion of the paper, by means of a push button 29, provide suitable resistance to the too free passage of the paper.

The feeding operation is performed by a carriage 33 which is mounted on a guide rod 32 and adapted to slide from the position shown in Fig. 1 to the opposite end of guide rod 32, and return, at each operation. This motion is imparted to it by means of connecting rod 10 which connects it to arm 8 which, as already described, is rigidly attached to, and forms a part of, the operating handle 4. On the down stroke of the handle when carriage 33 is moving away from the position shown in Fig. 1 it is adapted to slide over the paper, which at that time is being held by means of stripper 45 in a manner to be described; and on the return stroke of the handle when carriage 33 is returning to the position shown in Fig. 1, it is adapted to grip the paper and carry it along, feeding the completed transfer out of the machine. When the feeding operation is completed the transfer is severed by a knife 42 in a manner to be described. (The term "completed transfers" as used in these specifications and claims is to be understood as referring to transfers which are complete in the sense of being completely marked for their proper use, regardless of whether they are within or without the machine, or whether they are severed from or attached to other complete or incomplete transfers.)

Figures 6, 7:
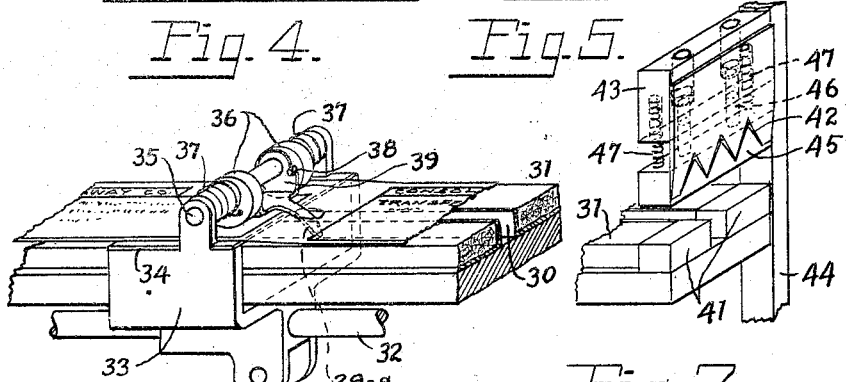
Fig. 6 is a pictorial view of a part of the platen and feeding mechanism, showing how the feeding mechanism grips the paper when it reaches the hole between the printed blanks in the strip.
Fig. 7 is a pictorial view of the knife and of the stripper which co-operates with the feeding mechanism by holding the paper during its backward stroke.

This gripping and feeding of the paper is accomplished as follows (see Figs. 1, 5, and 6): Carriage 33 carries a plate 34 which rides close above platen 31 but does not rub thereon. Somewhat above plate 34 and parallel to it is a shaft 35 which carries two eccentrics 36 rotatably mounted thereon. Springs 37 tend to rotate these in a clockwise direction as seen in Figs. 1 and 6, and to hold them in such a position that the paper will be gripped between them and the plate 34 when the carriage 33 is moving toward the right in Figs. 1 and 6. When the carriage is moving in the opposite direction, however, there will be no such gripping of the paper. Without any other control these eccentrics would cause carriage 33 to feed the paper forward at each stroke an amount equal to the length of the stroke.

But, as has already been mentioned, the paper roll contains blanks with certain printing already done thereon. No matter how uniform the feed on this machine, and on the press on which the blanks were printed, it is impossible to depend on a perfect registration from the beginning to the end of a roll. I therefore provide means for causing the paper to be fed out at each stroke just far enough to bring the blank space between two printed blanks under the knife. For this purpose I provide that when the blanks are being printed on the strip, holes are punched between the blanks, at the point where they are to be cut apart. This punching being done at the same time and on the same press on which the blanks are printed, the holes are spaced exactly as the blanks are spaced, feeding the paper forward the distance between adjacent holes means feeding it forward the exact length of the blank, and cutting the blanks apart at the holes means cutting the blanks apart and not cutting into them.

In order to cause the carriage 33 to feed the paper forward at each operation until this hole comes under the knife I provide a control for the eccentrics 36 which is governed in its operation by the location of the holes in the paper. This control member consists of a yoke 39 having shoulders adapted to catch on pins 38 in the eccentrics 36 and lift them from the paper when the yoke 39 is rocked in the proper direction. The yoke 39 carries a feeler 39—a which is adapted to drag over the paper as the carriage 33 slides along, and to enter one of the holes in the paper when it comes to such a hole. This feeler is so formed that when it rests on the surface of the paper it holds the eccentrics off of the paper and only allows them to grip the paper when it has dropped through one of the holes. Under the path of the holes in the paper and the path of the feeler 39—a is a groove 30 in the platen 31. This groove is sufficiently narrow to prevent the light spring pressure on feeler 39—a from forcing the paper into it, and is of such depth as to allow the feeler 39—a to enter the hole in the paper far enough to permit the eccentrics to grip the paper positively.

In the operation of this mechanism feeler 39—a slides over the paper, holding the eccentrics 36 from contact therewith, during the idle stroke of carriage 33. If the feeler 39—a passes a hole in the paper during this stroke it merely falls part way into the hole and immediately lifts out again due to the slant of the feeler. On the return or feeding stroke of the carriage 33 the feeler rides over the paper holding the eccentrics 36 from contact therewith and preventing the gripping and feeding of the paper until it comes to one of the holes in the paper. When the feeler 39—a reaches one of the holes in the paper, it enters, due to the pressure of springs 37 thus rocking yoke 39 and allowing the eccentrics 36 to rock on shaft 35 and grip the paper. The paper is then carried along with carriage 33 to the end of its stroke. The holes in the strip are punched between the blanks at the point where they are to be severed from one another in order to prevent marring the finished transfer. This makes it necessary for the movement of carriage 33 to continue until the feeler 39—a comes under the knife 42 which is to sever the transfer from the strip. In Fig. 7 it will be seen that this is made possible by notches in the knives 41 and 42 in line with the groove 30 in platen 31. Although convenient, these notches are not essential, because knife 41 may be made thin enough so that feeler 39—a need only come up to its inner surface, in order to bring the center of the hole to the cutting edge, in which case 41 and 42 could be made with unbroken cutting edges.

If it were desired to punch the holes in some other position relative to the printed blanks it would only be necessary to change the structure so that the carriage 33 would stop with the feeler 39—a in the same position relative to the knife as is the hole relative to the point where the transfer is to be severed from the strip.

With this arrangement it is apparent that, in whatever position the blank may have been at the beginning of the operation, at the end of the operation the transfer will be severed from the strip at the point where the hole is punched in the strip i. e. the space between the printed blanks. This means that there is no necessity for the person who inserts the paper into the machine to carefully locate it with reference to the knife but that the first operation of the machine will rectify the location. It also means that it makes no difference if the feed mechanism on the press on which the blanks were printed was working perfectly or not; it makes no difference if the transfers in the same roll, or in different rolls are the same length or not; it makes no difference if changes are made in the total length of transfer to be issued; the machine automatically, without adjustment, feeds out the correct length of paper and severs the transfer at the proper point.

At this point it may be noted that in order to care for blanks which are longer than the normal, the travel of carriage 33 is made considerably longer than the length of a normal transfer.

It should also be noted that if the eccentrics 36 were omitted the finger 39—a would itself feed the paper forward, especially if two such fingers and corresponding holes in the paper were provided. This might constitute a satisfactory feeding device if the friction between the paper and its guides, the inertia of the roll, and the speed of the feeding operation were small enough, and if the paper itself were strong enough to stand the pull and the shock load without tearing. However, I find that the only certain way to prevent tearing of the paper, especially that of a grade such as is commonly used for transfers, at the holes is to provide means, such as eccentrics 36, for securely grasping the paper on its unbroken surface.

Co-operation of cutting and feeding mechanisms

The manner in which the knife 42 and stripper 45 co-operate with the carriage 33 in the feeding operation will now be described. (See Figs. 1 and 7.) A rod 44, which is adapted to slide up and down in suitable guides attached to the frame of the machine, carries a projection 43. A knife 42 is rigidly attached to this projection 43 and thus moves up and down with rod 44. Against the left hand surface of the knife 42 is a stripper block 45 mounted to slide vertically with reference to the knife. Its motion is restrained by the guide pins 46 attached thereto and sliding in suitable holes in projection 43 on rod 44. These guide pins 46 have suitable heads which prevent the stripper 45 from going lower with reference to the knife than the position shown in Fig. 7. Compression springs 47 operating in holes in projection 43 serve to hold stripper 45 normally in the position shown in Fig. 7.

The manner in which the bar 44 is moved to operate the knife will be described later, but for the present it is sufficient to say that before the feeding stroke of carriage 33 begins bar 44 is moved upward raising knife 42 and stripper 45 to the position shown in Fig. 7 thus leaving a space through which the paper is fed out; and that when the feeding stroke of carriage 33 is completed the bar 44 is moved downward until the knife 42 and a stripper 45 occupy the positions shown in Fig. 1. When the feeding operation has been completed and the hole in the paper between the printed blanks is directly under the cutting edge of the knife 42 the depression of bar 44 causes stripper 45 to grip the paper beneath it before the knife 42 strikes the paper. When the knife 42 does strike the paper it shears the paper between the cutting edges of the knife 42 and the stationary knife 41. The knife and stripper remain in this position, closing up the opening into the machine and gripping the end of the paper remaining in the machine, all the time the machine remains idle and during the down stroke of the handle, which is the idle stroke of carriage 33, in the next operation of the machine. The fact that the paper is so held during the idle stroke of carriage 33 prevents the friction of feeler 39—a on the paper from pulling the strip backwards, getting it out of position for the registry of the printing thereon, and allowing it to get behind the stripper 45 and possibly catching behind it when the feeding operation begins. As soon as the idle stroke of carriage 33 is finished, and the feeding stroke is ready to begin, the knife bar 44 is lifted, lifting the knife from the paper while springs 47 cause stripper 45 to continue to hold the paper down, stripping it from the knife. As soon as the knife and stripper have reached the same relative position which they have in Fig. 7 and the paper is completely stripped from the knife, the stripper itself is lifted in unison with the knife, by means of the heads on guide pins 46, until the whole system has reached the position shown in Fig. 7. The feeding and cutting operations then take place as has already been described, and the machine is then ready for another operation.

It will be noted that the knife 42 is notched, having six shearing edges. In the form shown the knife 42 is not depressed sufficiently to completely sever the completed transfer from the strip, but leaves the transfer clinging to the strip in two points. This is done so that the completed transfer will remain clinging to the machine after severed from the strip by the knife. This obviates the necessity of having a receptacle for receiving the severed transfer and also prevents the danger of the loss of the transfer if the car windows are open and the wind is blowing through the car. It causes the transfer to project outward from the machine in such a way that the passenger can easily grasp it. The passenger gives the transfer a slight pull and the slight remaining attachment to the strip is severed over the sharp edges of the knife 41 and the stripper 45 which are gripping the paper. This makes it unnecessary for the conductor to touch the transfer, the only act required on his part being the pressure on the handle or treadle. Another advantage of the incomplete severance is to be noted when two or more transfers are issued to one person. These will naturally cling together in a strip and unless torn apart by the passenger will still be together when given to the conductor on the other car. This will enable the conductor to count the number of transfers being handed to him by one person with greater ease and rapidity than when a number of transfers taken from one pad and punched together are handed to him. It will also make it unnecessary for him to read the date and time on more than one of them because he will know that all transfers clinging together are similarly marked. Still another advantage of the incomplete severance is to be found in the elimination of the danger that transfers in a pad are frequently difficult to separate and an extra transfer may be issued inadvertently.

Should it be desired to completely sever the transfer from the strip it is only necessary to lower the knife 42 with reference to the projection 43 on rod 44, or if desired, to substitute a knife with a straight shearing edge, or knife of any other suitable form for the one shown in Fig. 7.

Figure 8:
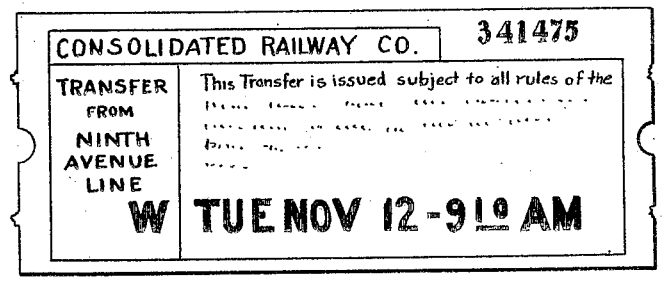
Fig. 8 shows one form of transfer issued by the machine.

The important fact to be observed is that even though the transfer is not completely severed it is so cut that it is definitely separated from the rest of the strip, the line of separation being so definite and so deeply cut that there is no danger of the persons taking the transfers from the machine tearing them apart at any but the proper point. It will also be noted that with a knife of the form shown the paper is cut inward from the edges as well as in the center of the strip. This removes the danger of the tear beginning at the incorrect point, or of the corners being torn off. Reference to Fig. 8 will show the location of these points of attachment to the strip. It may, however, be noted that in this figure the way in which the tearing off takes place has been rather distorted in order to make these points conspicuous in the drawing. In practice they are torn over the sharp edges of the knife and stripper and are scarcely distinguishable from the edges which have been cut by the knives. Throughout these specifications and claims wherever the word "sever" is used it is meant to denote the positive demarkation, or separation of one transfer from another so that there is no possibility of their being torn apart at the incorrect point without a deliberate effort to do so, regardless of whether the severance is complete or not quite so.

It will have been noted that the idle stroke of the feeding carriage 33 is coincident in point of time with the down stroke of the operating handle, and that the feeding stroke of the carriage is coincident in point of time with the return stroke of the handle. When the function of the knife and stripper in cooperating in the feeding operation, as well as in performing the cutting and stripping operations, is considered; and when it is considered that the completion of the return stroke of the operating handle is the completion of the operation of the machine; it will be seen to be necessary to time the cutting operation of the knife to take place at the completion of the return stroke of the operating handle, i. e. the completion of the feeding stroke of the carriage; and to time the lifting of the knife and stripper from the paper to take place at the completion of the down stroke of the operating handle, i. e. the completion of the idle stroke of the feeding mechanism or carriage. The method in which this is accomplished will now be described.

*Knife operating mechanism*

The mechanism for operating the knife bar 44 is illustrated in Figs. 1, 2, 3, and 5. A lug or roller 49 projects from the side of rod 44. An arm 51, loosely mounted on shaft 3, has a forked end which is adapted to co-operate with roller 49 to move rod 44 when arm 51 is moved. Rod 44 is pulled downward to cause the knife to act by means of a spring 48. When the operating handle is depressed to the limit of its motion a compression spring 64, which is carried in a projecting lug 61 on member 9 which forms a part of the handle, is brought into contact with the lower edge of arm 51. (See Fig. 2.) This spring is of such strength that when the operating handle is fully depressed spring 64 easily overcomes spring 48 and lifts arm 51 and rod 44 to the position shown in Fig. 2. When this mechanism is in this position the knife and stripper are in the position shown in Fig. 7. As soon as the return stroke of the handle and feeding stroke of the carriage 33 begin, the spring 64 is removed from contact with the arm 51. In order to prevent the spring 48 from immediately pulling the knife down onto the paper and cutting it before the feeding stroke is completed, mechanism is provided which holds the knife bar 44 against the tension of spring 48 until the completion of the feeding stroke of carriage 33, and then releases it. This mechanism comprises a pawl 52 which is pivotally mounted on arm 51 and adapted to catch on a lug 58 attached to the frame of the machine. It will be noted that the surface of contact between the pawl 52 and the lug 58 is at such an angle that pressure on arm 51 will cause pawl 52 to slide off of lug 58. To prevent this occurring until the completion of the feeding operation, the pawl 52 is held in the position shown in Fig. 2 by a toggle in which link 53 is pivotally attached to the upper end of pawl 52 and connected at its other end by a pivot 56 to another link 54 which is attached to arm 51 by a pivot 55. In the position shown in Fig. 2 the pivot 56 is slightly below the dead center and link 54 is held against further rotation in a counter-clockwise direction by a pin 59 projecting from the arm 51. When the parts are in this position the attempt of pawl 52 to slide off of lug 58 merely causes link 54 to press more tightly against pin 59, and the arm 51 and rod 44 are thus held up until the completion of the feeding stroke. At the completion of the feeding stroke a screw 62 in a projecting lug 60 on member 9, which forms a part of the operating handle, comes in contact with the projecting end of link 54 and rocks it in a clockwise direction until it is past the dead center, releasing pawl 52 and allowing the pressure of spring 48 to pull rod 44, carrying the knife 42, and arm 51 and connected parts downward, severing the completed transfer and bringing the parts to the position shown in Fig. 1. This cutting operation is timed to take place when the feeding operation, which is to say the motion of the operating handle, is completed, by adjusting the screw 62 which is then held in adjustment by means of a lock nut or other expedient.

When the operation has been completed and the knife has been depressed by means of spring 48, the spring 57 pulls the pawl 52 back to its original position, but this time under the lug 58 on the frame of the machine, as shown in Fig. 1. The spring 57 being attached to the link 53 above the pivot, it aids gravity in pulling the connecting pivot 56 below the dead center, and causing pawl 52 to be locked and to hold the arm 51 and rod 44 in the position shown in Fig. 1 after the spring 64 comes into contact with the arm 51, and tends to lift it and rod 44. Arm 51 and rod 44, carrying the knife and stripper, are thus held down clamping the paper until the completion of the down stroke of the handle, which corresponds with the idle stroke of the carriage 33. At the completion of the down stroke of the handle a screw 63, which is carried by lug 61 on the member 9 attached to the operating handle, comes into contact with link 54 and rocks it in a clockwise direction until it is past the dead center, thus releasing pawl 52 and allowing the pressure of spring 64 on arm 51 to lift it and rod 44, thereby lifting the knife and stripper from the paper. The relative locations of spring 64 and screw 63 are clearly shown in Fig. 5. The action of this toggle and the pawl 52 may be better understood by referring to Fig. 3 which shows the position which the parts occupy at the instant they are passing the mid-point of the motion of arm 51 on either its upward or downward stroke.

Thus it will be seen that not only is the feeding operation dependent for its proper performance upon the co-action of a part of the cutting mechanism, as described in connection with the feeding mechanism, but the cutting mechanism itself is in turn dependent upon the feeding mechanism, being timed and controlled in its action by the feeding mechanism by means of what I believe to be a novel co-action between these two mechanisms.

Printing mechanism

The date, time, etc. are stamped on the blank by type wheels mounted in a frame 71. (See Figs. 1 and 5.) The end members of this frame contains slots 72 in which blocks 73 are adapted to slide. The blocks 73 are pivoted on bearings 74 carried by bosses 75 formed on the frame of the machine. The frame 71 also carries pivots 76 fixed in opposite ends thereof, by means of which arms 77, mounted to rock on shaft 78 carried by the frame of the machine, are connected thereto. The arms 77 connected to the opposite ends of the frame 71 are connected together at their other ends by a rod 79. In order to perform the printing operation the arms 77 are rocked on the shaft 78 to the position shown by the broken lines in Fig. 5. This causes the type to leave the ink pad 85, against which they normally rest as shown in Fig. 5, in a direction substantially normal to the pad, to be swung around through a 90° angle, the blocks 73 sliding in slots 72, and brought into substantially normal contact with the paper which is supported by the platen 31, as shown by the broken lines in Fig. 5.

This motion is imparted to the arms 77 by means of connecting rod 80 connected at its upper end to rod 79 and at its lower end to a boss 81 formed on the operating handle 4. The connection of connecting rod 80 to rod 79 is slotted and furnished with a spring 82 so that when the operating handle is depressed to the limit of its motion and boss 81 raises the connecting rod 80 to the limit of its motion, the arms 77 will be rocked to bring the type in contact with the paper, before connecting rod 80 reaches the limit of its motion, and from this point on, the spring 82 will be compressed giving a spring-pressed contact of the type with the paper. This prevents the contact of the type with the paper from forming the stop for the manually operated handle, and thus removes the danger of straining the mechanism, and permits of the pressure of the type on the paper being made just as heavy as desired by using a spring 82 of the proper strength.

A spring 83 attached to connecting rod 80 assists the main operating spring 7 in returing connecting rod 80, arms 77, and the printer to normal position where the type rest against the ink pad, as in Fig. 5. As may be seen in Fig. 1 the connection of connecting rod 80 to the boss 81 contains a certain amount of lost motion. This is put there so that when the operating handle is returning to its normal position and the type come in contact with the ink pad 85 they will be pressed against the pad by spring 83, and will allow the operating handle and connected parts to continue their motion till it is fully completed. This is necessary because the ink pads may vary in thickness and if the type striking the pad formed the stop for the operating handle it might come to a stop in different places due to a change of ink pads. The spring 83 may be made of the proper strength to give proper pressure on the ink pad to secure the desired effect in the inking of the type. The ink pad 85 is arranged so that, for purposes of renewing or reinking, it may be easily slipped off of or onto a crossbar on the frame where it is held by a spring catch, not shown.

The type which are used for stamping the date, time, etc. on the transfer are formed on type wheels 93 which are mounted on a cross shaft 91 in the frame of the printer. To hold the type in alignment the hole through the type wheels, where they are mounted on shaft 91, contains a notch 94 corresponding to each of the type-faces on the wheel. (See Fig. 5.) Co-operating with these notches is a plunger 95, corresponding to each type wheel, which slides in a hole drilled in shaft 91 and is pressed outward into one of the notches 94 by means of a spring 96. The type are set by means of gears 97 which mesh with gears formed on the sides of each of the type wheels. The gears 97 project from the printer frame 71 so that they may be easily grasped and turned by hand to set up any desired date, time, etc. In order that the operator may know the date and time for which the type are being set each of the gears 97 has an index drum 98 attached, with the characters corresponding to the type plainly marked thereon. These may be seen in Fig. 1 where they appear inverted because they are designed to be read from the top of the machine and from the other side.

If it is desired to print serial numbers on the transfers as issued by the machine, a numbering machine 100 may be placed on another cross shaft 92 in the frame 71 of the printer. The numbering machine is operated, to give consecutive numbers to the transfers as issued, by an arm 102 controlled by a spring 103 and shifted by contact with a fixed part of the main frame of the machine, at each operation. In order to distinguish between like serial numbers printed by different machines, a set of numbering wheels 101 is shown, mounted on the same shaft 92, which are adapted to be set to print a car, conductor, or machine number in addition to the serial number. This car number is not shown on the transfer shown in Fig. 8, but simply the serial number printed by numbering machine 100.

Warning bell

In order to warn the conductor in case some person should attempt to operate the machine without his knowledge, a warning bell 110 (see Fig. 4) is provided. This bell is mounted on the left end of the frame of the machine adjacent to the operating handle 4.

A tapper 111 is provided to strike the bell. This is mounted on a spring wire 112 which is coiled about a screw stud 118 and has its other end 113 projecting downward from the stud 118. A pin 114 holds the tapper 111 normally slightly removed from the bell in order to produce a clear ring when it strikes the bell. The bell tapper 111 is operated by rocking member 116 projecting into the path of the operating handle 4 and having a projection 117 on its other end adapted to strike the wire 112, when the handle 4 strikes member 116 rocking it in a counter-clockwise direction, and to spring the wire 112 and tapper 111 back to the position indicated by the broken lines in Fig. 4. When the handle 4 reaches the extremity of its motion the member 116 slips over it and allows the tapper to strike the bell. At the same time the spring 112 carries member 116 back into the path of the operating handle. On its return stroke the handle again strikes the member 116 and rocks it in the opposite direction against the tension of the spring by contact with the projecting end 113, as indicated by broken lines in Fig. 4. Before the handle has completed its return stroke member 116 again swings free and returns to substantially the position shown in Fig. 4.

Speed controlling device

To prevent the spring 7 from returning the mechanism to its normal position at an excessive speed, and causing possible damage to the mechanism or tearing of the paper, I provide a speed controlling mechanism in the form of an air dash pot 120, attached to the frame of the machine. A solid piston 121 therein is attached by means of connecting rod 122 to the operating handle 4. (See Figs. 1 and 4.) This dash pot is closed at its upper end and open at its lower end. A port 125 (see Fig. 4) is provided just above the piston at the lower extremity of its motion in order to relieve the suction above the piston, which might otherwise nullify, to a large extent, the retarding effect on the return stroke. In a device where the resistance should be somewhere near uniform throughout the length of the motion it is usual to use dash pots containing oil or other liquid because in an ordinary air dash pot the resistance increases rapidly as the piston approaches the closed end of the cylinder. To overcome this I provide that, at the point where the resistance has reached the desired strength, the inside diameter of the cylinder begins to gradually increase towards the closed end. This provides a greater relief as the pressure tends to become greater, thus comparatively equalizing the resistance throughout the length of the dash pot, or as great a portion of the length as desired. This makes it possible to use a simple air dash pot in place of one containing a liquid which is subject to danger of leakage, changes of viscosity due to changes of temperature, and other serious objections. The larger internal diameter at the closed end also provides another feature of great importance in this machine. The resistance of the air may be made comparatively little at the end of the stroke when the power in spring 7 is almost exhausted, when spring 83 no longer serves to aid it because the type have already come into contact with the ink pad, and when it is necessary that the mechanism shall not stop until it has broken the toggle on arm 51 to release the knife to sever the completed transfer.

Thus it will be seen that this novel form of dash pot coacts, in what I believe to be a novel manner, both with the feeding mechanism per se, controlling it as required, and with the novel inter-relations between the feeding and cutting mechanisms, which have been described, to aid in causing their normal functioning where the usual form of air dash pot would hinder rather than aid.

Paper roll renewing device

In most machines using paper from rolls it is necessary to insert a new roll at the time the old roll becomes exhausted regardless of whether or not it is convenient to do so at that time, or else to throw away the end of the old roll at a time when it is convenient to make the change. In a machine of this character it would be a serious matter if the roll had to be renewed at a time of traffic congestion, so I provide means whereby the operator can insert a new roll in the machine at any time it may be convenient when he finds that the roll in the machine is nearing exhaustion. At the end of each trip time for such matters is usually available without delaying the traffic. As the capacity of this machine is a roll of approximately one thousand transfer blanks it is evident that a roll will ordinarily contain enough blanks for a considerable number of trips. If, when the operator resets his machine at the beginning of a trip, he finds the roll getting small and thinks there may possibly not be enough to last for that trip he can slip the remainder of the roll in use from roller 22 and place it on secondary roller 24 (see Fig. 1). He then places the new roll on roller 22 and pushes the end of the paper into slot 25, as is indicated in Fig. 1 by the broken line leading from roll 23. He then closes the machine again and, when the old roll is exhausted, the end of the paper therefrom automatically picks up the beginning of the strip on the new roll and the process continues without further attention from the operator, as though there had been no change of rolls.

Figure 9:
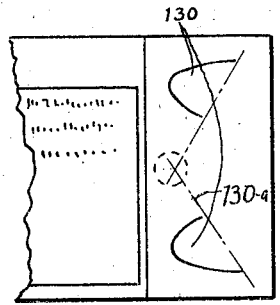
Fig. 9 shows the way tongues are cut on the inside end of the paper in each roll.
Figure 10:
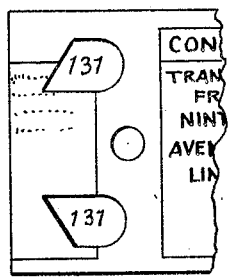
Fig. 10 shows how holes are punched in the outside end of the paper in each roll.
Figure 11:
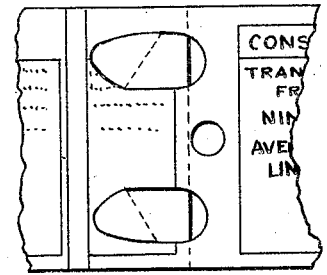
Fig. 11 shows how the joint appears after the tongues are hooked into the holes.
Figure 13:
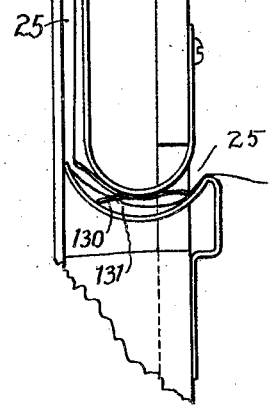
Fig. 13 is a detail view showing how this process occurs on the machine, and showing the means for raising the tongues from the paper to cause them to enter the holes.
Figure 12:
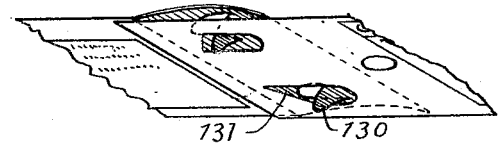
Fig. 12 shows a pictorial view from below with the tongues just entering the holes.
Figure 14:
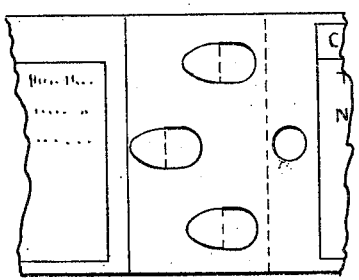
Fig. 14 shows a modified form of tongues and holes.

The method in which this is accomplished may be seen by reference to Figs. 9 to 11. Fig. 9 shows tongues 130 formed on the end of the strip on the inside of each roll, preferably by cutting the paper around the edges of the tongues as shown in the figure. If the paper used is not stiff enough for the purpose a piece with the desired tongues formed thereon may be gummed onto the end of the strip as shown in Figs. 9, 12 and 13, beginning at the end of the last blank on the strip. It should be noted that the lines of attachment 130—a of these tongues to the body of the paper are both diagonal and form two intersecting lines. Fig. 10 shows two holes 131 punched in the end of the strip on the outside of each roll. It should be noted that the forward edges of these holes correspond to the lines of attachment 130—a of the tongues 130, as shown in Fig. 9. When the tongues 130 shown in Fig. 9 are hooked into the holes 131 shown in Fig. 10 the two strips are hooked together and form, in effect, one strip as shown in Fig. 11. The fact that the lines of attachment 130—a of the tongues 130 and the forward sides of the holes 131 which form the lines of attachment between the two strips are in two distinct lines, prevents them from bending along the line of attachment and releasing their hold when under tension. It is not necessary that the lines of attachment form two intersecting lines as in Figs. 9 to 11, they may form two parallel lines as in Fig. 14 and attain the same result.

In order to secure the automatic hooking together of the two strips without any attention from the operator the tongues 130 are formed on the end of the strip which is rolled in the center of the roll, and the holes 131 on the end which is rolled onto the outside of the roll. When the paper is all off of the roll the end of the strip will be decidedly curled. As this curled end is pulled through the slot 25, (see Fig. 13) which at the bottom curves in the opposite direction, the curl is partially removed therefrom. The tongues 130, however, being shorter than the paper from which they are formed do not have so much of the curl removed from them, and they therefore raise themselves from the paper from which they are formed, their forward ends reaching to the limit of the space allowed them in slot 25. The end of the paper from the new roll has already been pushed into this slot as shown in Figs. 1 and 13. When the tongues 130 reach the holes 131 they will enter them as shown in Fig. 13. As the paper continues to be pulled through slot 25 the joint is pulled tight and the paper continues as though it were a single strip.

In Fig. 11 it will be seen that the joint takes place between two blanks. This means that when the paper is fed through under the printer and the last blank on the old roll is printed it has this joint attached to it. The feeding operation is controlled by the hole at the forward end of the first complete blank in the new strip and the last transfer on the old strip is fed out longer than the others, having the joint on the end. This need not injure the validity of the transfer and may be torn off if desired. This extra long transfer is made possible by the fact that the motion of the feeding carriage 33 is longer than the normal transfer, as was mentioned in the description of the feeding mechanism. In case the operator should push the end of the new roll into the slot 25 beyond the curved portion the joint will be made in the same way because the slot 25 is narrow enough throughout its whole length to cause the raising of the tongues 130 so that they will enter holes 131 in the new strip. The way in which the tongues 130 enter the holes 131 may be more easily understood from Fig. 12 which shows a pictorial view from below of the two ends just as the tongues are entering the holes, but without showing the slot which is taking part of the curl out of the end of the paper from the old roll. These figures show the tongues formed in a piece of heavier paper gummed onto the end of the roll. If the paper used is sufficiently heavy the above process will take place properly if the tongues are formed directly in the strip itself.

Form of transfer

Having described my machine in detail I will now describe the transfer issued thereby, and the operation of the machine by which the transfer is issued. Figure 8 shows one form of transfer which may be issued by my machine. The name of the railway company, the line which issues the transfer, the rules for use of the transfer, and any other information desired is already printed on the blanks when they are placed in the machine. This printing is preferably done in black and then my machine stamps the day of the week, the month, the day of the month, the hour and minute at which the car is due to reach the transfer point, and whether it is an A. M. or P. M. hour, on the transfer in a different color, preferably red as that renders this information most conspicuous. In addition to this information I provide that, in the space under the name of the line issuing the transfer, is printed a character designating the direction of travel of the car from which the transfer was issued, because this may have something to do with the validity of the transfer on other lines. On this same type wheel there is space for a number of characters in addition to those necessary to indicate directions. These may, if desired, be used to designate certain sections of the line from which transfers may or may not be valid on other lines. In this case it would simply be necessary to inform the conductors on the other lines that a transfer from a certain line is only valid on certain other lines if it bears certain characters.

In addition to this information I show the serial number as printed by my machine, but without the car number for which the type are shown in Fig. 1. This serial number may be printed as shown by my machine, or it may, if desired, be printed on the blanks themselves when they are printed. In this case the control would be kept by knowing what serial numbers were issued to each conductor. This is the more easily possible because I have provided for accommodating rolls of one thousand blanks in the machine, and no blanks need be lost when rolls are changed.

It may be further observed that, if desired, other information could be stamped on by my machine. Reference to Fig. 1 will show that there is a large unoccupied space on the shaft 92 in the printer frame, which could be provided with type for printing anything desired on the transfer. I prefer, however, to limit the amount of information stamped on the transfer in red ink by my machine to the most necessary data because it is thereby rendered more conspicuous and easy to read. If desired part of the data which I show printed in one line could be printed in the line fixed by the shaft 92 in order to separate it and render it more readily legible. The printing of the day of the week in addition to the month and day of the month is highly desirable because the person taking the transfer will much more quickly recognize that it is Tuesday, than that it is Nov. 12. The month and day of the month are simply a further check which will positively distinguish the date stamped from any other date within six years. Probably the most valuable feature, however, is the stamping of the hours and minutes in letters equally conspicuous. The reason for this is that the greatest loss from fraudulent use of transfers occurs because transfers are used after the time limit thereon has expired and it is impossible for the person taking the transfers to accurately read the markings usually used, in the time at his disposal, when traffic is even moderately heavy. With the large and conspicuous time marking which I provide the danger of such fraudulent use is reduced to a minimum because of the ease with which it can be detected. Because the hour is so conspicuous comparatively few people will even attempt to pass a transfer so marked after the time limit thereon has expired. This is the particular feature that has heretofore been impossible.

*Mode of operation*

The operation of the machine is as follows: At the beginning of each trip the operator lifts the cover of the machine and by means of the gears 97 he adjusts the type by bringing the correct characters on index drums 98 to the index line (not shown) to print the correct direction of travel of his car, and the time which he is due to reach the standard transfer point. He then closes the machine, because all transfers issued on that trip will be stamped with the same time and direction of travel. Only at the beginning of each day does he have to adjust the type for stamping the date. When he observes the paper roll getting small he will, when at the end of a trip he is not so hurried, slip the remainder of the roll off of roller 22 onto roller 24 (see Fig. 1) and place a new roll of blanks on roller 22, taking the end of the paper from the new roll and entering it in slot 25 as indicated by the broken lines in Fig. 1. He then closes the machine and need not again think of changing rolls until the roll he has just inserted is nearly exhausted. To operate the machine it is simply necessary for the operator to press down the handle or treadle to the limit of its motion and then release it, for each transfer which he desires to issue.

*Modified forms of feed mechanism*

Figure 16:
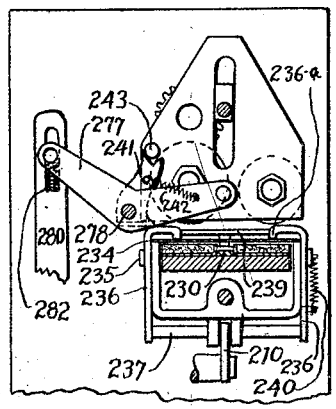
Fig. 16 is a section of the upper part of the machine shown in Fig. 15, taken on the line 16—16 of Fig. 15, and showing the parts as they appear when the feeding mechanism is stopped under the printer, and showing how the printer is prevented from coming in contact with the feeding mechanism.
Figure 15:
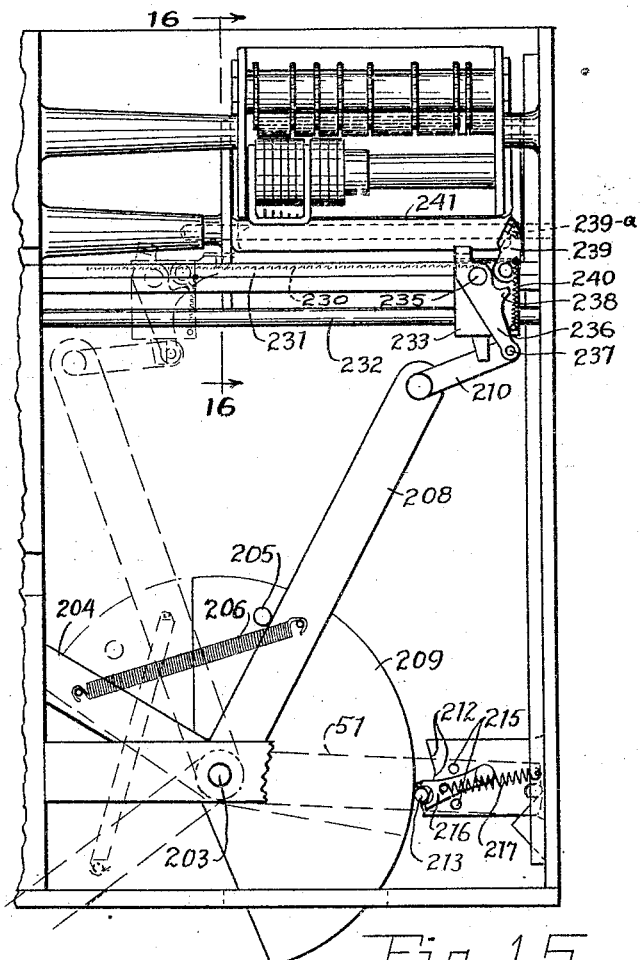
Fig. 15 is a front elevation of the machine, with certain parts omitted, and showing a modified form of feeding mechanism and full stroke device.
Figure 17:
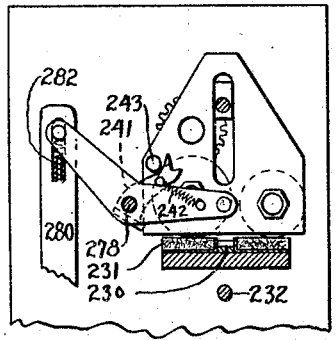
Fig. 17 is a section taken on the same line as Fig. 16 but showing the parts in their printing position during the normal operation of the machine.

A modified form of feeding mechanism is shown in Figs. 15, 16, and 17. In this form the stroke of the feeding carriage 233 is not uniform as was that of the carriage 33. The idle stroke in this case is limited to the length of the blank to be fed out, which in turn means that the feeding stroke, which merely returns the carriage to its normal position, is also of the same length as the blank to be fed out. This feeding action is regulated by means of the holes in the strip of paper between the blanks, which were used to control the mechanism previously described. In this case there is a rack 230 in the place of slot 30 in the platen under the path of the holes in the paper. A pawl 239 pivoted to the carriage 233, and sprung down by an extension spring 240, has a point 239—a adapted to drag over the paper on the idle stroke of the carriage and enter one of the holes in the paper. As soon as the point 239—a on pawl 239 enters a hole in the paper it is caught by one of the teeth in rack 230 and the motion of the carriage 233 is arrested. In this case the arm 208 which operates the carriage 233 by means of connecting rod 210 is not rigidly attached to the member 209 which forms a part of the operating handle 204. Arm 208 is moved to its normal position when the handle returns to its normal position, by means of pin 205 in member 209 which contacts with the arm 208 and pushes it to its normal position shown in Fig. 15. When the carriage 233 and arm 208 are arrested, as indicated by the broken lines in Fig. 15, by the point 239—a on the pawl 239 dropping through one of the holes in the paper and catching on one of the teeth in the rack 230, the handle 204 with member 209 and pin 205 therein continue their motion simply extending spring 206 which tends to hold arm 208 against pin 205. As handle 204 returns, spring 206 contracts until pin 205 contacts with arm 208 which is then carried thereby to the position shown in Fig. 15. When carriage 233 approaches its normal position pawl 239 strikes a fixed part of the frame of the machine and is rocked upward out of the hole in the paper to the position shown in Fig. 15. This makes it possible for the hole in the paper to be carried under the knife without interference from the pawl 239. Thus it may be seen that wherever the hole in the paper may be at the start of an operation it will be fed out so that it will be under the knife at the end of the operation.

For gripping the paper I provide, instead of the eccentrics used on carriage 33, arms 236 on opposite sides of the carriage 233, and pivoted thereto by pivots 235, which are formed on their upper ends to project over the paper and grip it between lugs 236—a thereon and the plate 234 whenever the arms 236 are rocked in a counter-clockwise direction. These arms 236 are connected at their bottom ends by a rod 237 to which the connecting rod 210 is attached. This connection automatically rocks arms 236 in a clockwise direction and lifts them from the paper, as shown by the broken lines in Fig. 15, when the arm 208 is pulling the carriage backward over the paper, and rocks them in the other direction to grip the paper as soon as arm 208 is operated in the other direction to move the carriage on its feeding stroke. On the feeding stroke when arms 236 are rocked to grip the paper a projection 238 thereon strikes pawl 239, lifting it slightly so that it does not drag over the teeth on rack 230.

A little consideration will show that with this arangement a case might occur when carriage 233 might be stopped under the printer. In order to prevent the printer from coming down upon it and damaging the type in such a case means is provided to prevent the full depression of the printer in case the carriage 233 should be stopped beneath it. For this purpose I provide a yoke 241 mounted on the same shaft 278 on which the printer operating arms 277 are mounted. An extension spring 242 holds this yoke 241 normally in the fixed position with relation to arms 277 shown in Fig. 17. In the normal operation of the machine it simply rocks on shaft 278 along with the arms 277 and has no effect whatever on the operation of the machine. (See Fig. 17.) If, however, the carriage 233 should be stopped under the printer, as shown in Fig. 16, the flat portion of yoke 241 will strike the carriage 233 as the arms 277 are rocked to operate the printer. This arrests the rocking of the yoke 241 while allowing arms 277 to continue to rock, extending spring 242. Yoke 241 is thus held in the position shown in Fig. 16 as the printer descends. When the yoke 241 is in this position bosses 243 on the ends of the frame of the printer enter the forks in the ends of yoke 241 and arrest the downward motion of the printer before the type strike the carriage 233. The compression spring 282 in the end of connecting rod 280 allows the printer to stop in this position while the motion of the handle is completed. It should be noted that the bosses 243 strike the left hand sides (as seen in Fig. 16) of the forks in the ends of the yoke 241 first, thus rocking the yoke backwards sufficiently to lift it from the carriage 233 and thus relieve the carriage from all strain.

Figure 20:
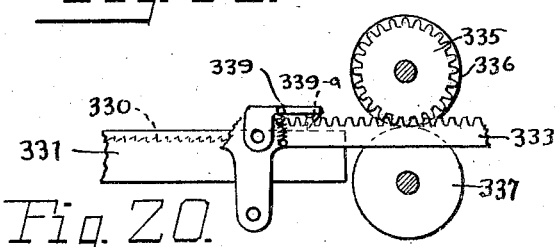
Fig. 20 shows another modification of the feeding mechanism.

Another modification of the feeding mechanism is shown in Fig. 20. This is adapted to be controlled by the holes in the paper between the printed blanks just as in the other two forms described. In this case, however, in place of the reciprocating feeding mechanism there are two feed rolls 336 and 337 which feed the paper forward when they are turned. The rolls are turned by a reciprocating rack 333 which meshes with a gear 335 attached to roller 336 by a ratchet connection, not shown in the drawing, so that when the rack 333 is moved to the right in the figure it will turn the roller 336 and when it is moved to the left it allows the roller 336 to remain stationary. The control from the holes in the paper is operated in the same manner as in the last described mechanism. The rack 333 carries a pawl 339 having a point 339—a adapted to enter a hole in the paper and come into contact with one of the teeth on rack 330 underneath, and thereby arrest the movement of the rack 333 on its idle stroke. The length of the feeding stroke of rack 333 and consequently the amount of the rotation of the feed rolls 336 and 337 and the length of paper fed out, are determined by the location of the hole in the paper just as in the previous case. The movement of the rack 333 is controlled in exactly the same manner as that of carriage 233 by arm 208, pin 205, and spring 206 in the modification last described. If it is desired in this arrangement to use a gear 335 of pitch diameter larger or smaller than roller 336 it is simply necessary to remove the pawl 339 from direct connection with the rack 333 and use intermediate gear or lever connections of any desired kind which will give the same ratio between the travel of rack 333 and that of pawl 339 as there is between the travel of rack 333 and that of the periphery of roll 336.

*Modified forms of full stroke device*

In Fig. 15 there is also shown a modified form of full stroke device. The principle is the same as that of the one shown in Fig. 1 and the difference lies in the manner of shifting the roller ratchet from one side to the other at the completion of the stroke. It will have been noted in the description of the mechanism for operating the knife to sever the completed transfer, that the arm 51 moves upward at the completion of the down stroke of the operating handle and downward at the completion of the return stroke. In this modification of the full stroke device this motion of arm 51 is used to shift the roller ratchet. In Fig. 15 the position of arm 51 is indicated by broken lines in order not to obscure the full stroke mechanism. The two pins 215 shown in full lines are really attached to this arm 51 and move up and down with it. In the position shown in this figure the roller ratchet 213 is adapted to allow downward movement of the handle and upward movement of the arcual member 209 in contact with roller 213. When the downward movement of the handle is completed, and arm 51 is suddenly sprung upward, the lower one of the pins 215 strikes the arm 216 which moves roller 213 upward into contact with the upper one of the surfaces 212. The arm 216 and roller 213 are held in this position by spring 217 which is adapted to pull them either direction from their mid-position. At the completion of the return stroke of the handle the arm 51 is suddenly sprung downward carrying arm 216 and roller 213 back to the position shown in Fig. 15. With this arrangement no notches are necessary in the cylindrical surface of member 209 and there is no danger of there being any possibility of reversing the motion of the operating handle until each stroke has been entirely completed and the operation of the knife has taken place.

Figure 18:
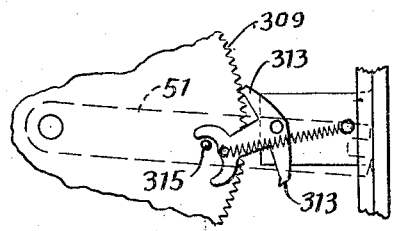
Fig. 18 is a detail showing another modification of the full stroke device.

Fig. 18 shows a similar arrangement with a toothed ratchet 309 and pawl 313 in place of the roller ratchet heretofore illustrated. The pawl 313 is shifted by means of pin 315 in the arm 51 just as the roller ratchet was shifted in the mechanism illustrated in Fig. 15.

With either of these arrangements it will be seen that the full stroke device forms a positive interconnection between the feeding and cutting devices, i. e. the full stroke device forms a lock which positively prevents another stroke of the feeding mechanism until operation of the cutting device shifts the full stroke device, thus allowing another stroke of the feeding mechanism to take place. This is similar to the control which the feeding mechanism exerts, through the medium of the toggle latch, over the action of the cutting device. This toggle latch forms a positive lock which prevents another stroke of the cutting device until the completion of the stroke of the feeding mechanism breaks the toggle, thus allowing another stroke of the cutting device to take place. The toggle latch is the means by which the feeding mechanism controls the cutting device, and the full stroke device is the means by which the cutting device controls the feeding mechanism. Thus in the operation of the machine each stroke of the cutting device is prevented until the toggle is broken by the completion of the stroke of the feeding mechanism; and the next stroke of the feeding mechanism is prevented by the full stroke device until this is shifted by the operation of the cutting device in one direction. This permits the feeding mechanism to operate in the other direction and the foregoing cycle to repeat itself, but in the opposite direction. The same cycle continues to repeat itself in alternate directions, making one double cycle at each operation of the machine. The interconnections between the feeding and cutting devices, as above described, positively prevent failures in the proper functioning of the mechanism such as would occur if either stroke of the feeding mechanism should begin before the cutting device had operated, or if the cutting device should operate before the completion of either stroke of the feeding mechanism. It should be noted in this connection that this inter-dependence and timing is not imposed by any separate timing member such as a cam shaft or the like, but is due to an actual inter-action between the several elements of the mechanism in turn. Thus it will be seen that the feeding mechanism breaks the toggle, the toggle then releases the cutting device, the cutting device moves the full stroke device to its opposite position, and this movement of the full stroke device permits a reversal in the direction of movement of the feeding mechanism, this cycle repeating itself indefinitely as long as the machine is operated. It should also be noted that the feeding devices are in reality an integral part of, and may properly be considered to be the prime mover in the machine, and that the cutting devices receive their power therefrom and are so controlled thereby as to perform the major part of their operations in both directions at times when the motion of the prime mover itself has ceased.

Figure 19:
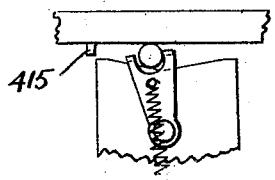
Fig. 19 is a detail showing the full stroke device applied to rectilinear motion.

Fig. 19 illustrates another variation of the roller ratchet showing it as applied to a rectilineally moving part e. g. the carriage 33. In this case the roller is shifted from one side to the other by a pin 415 projecting from the surface over which the ratchet works. This arrangement is open to the disadvantage that the point at which the change in direction of motion is permitted is not so definite and positive as in the other arrangements. This can, however, be remedied in a straight line arrangement, if it is objectionable, by substituting the form of mechanism illustrated in Fig. 1, except that it be formed in a straight line instead of in a curve.

Figure 21:
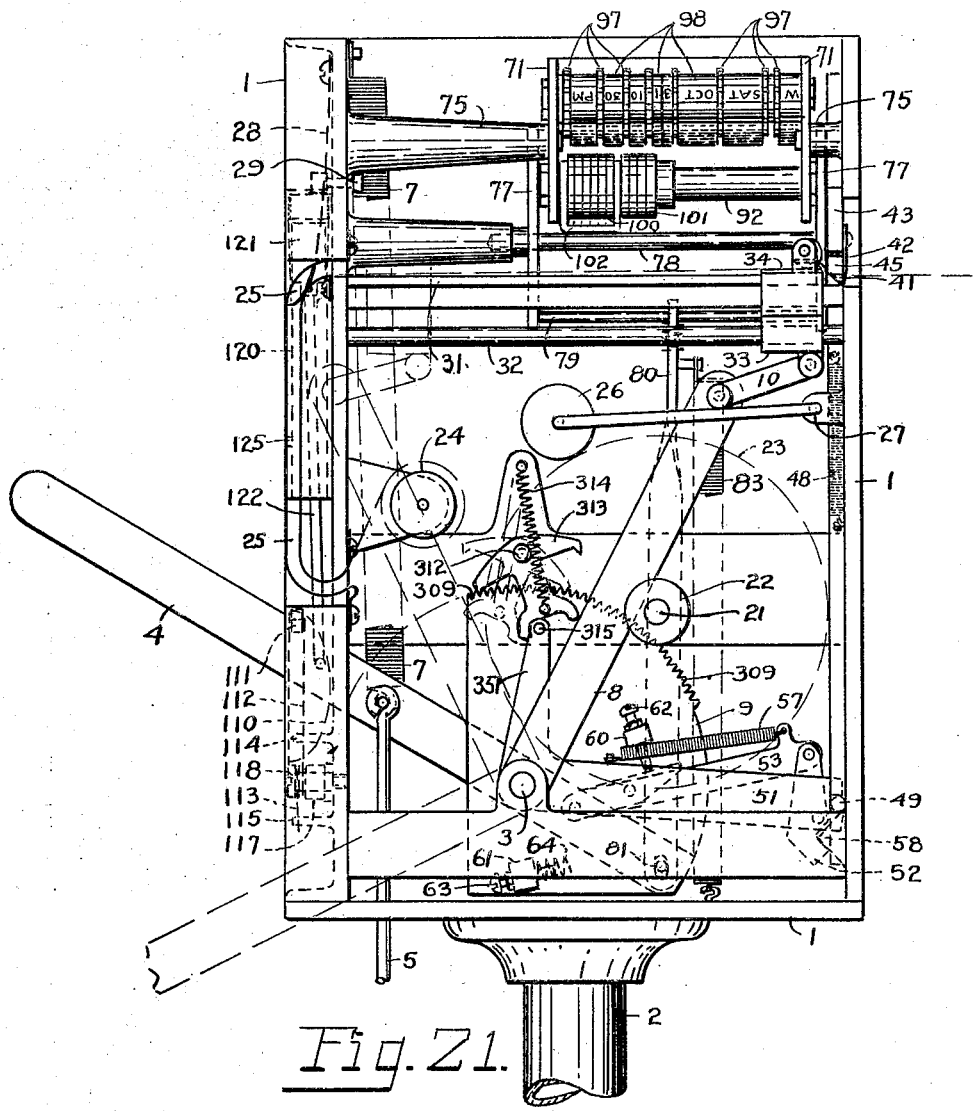
Fig. 21 shows a front elevation of the machine as in Fig. 1 but incorporating the preferred form of full stroke device as shown in Fig. 18.

*Description of the alternative form of mechanism using the full stroke device of Figures 18 and 21*

Figure 21 shows a general view of the mechanism as illustrated in Fig. 1 but modified to incorporate the full stroke device of Fig. 18. Because of the more positive action of this form of full stroke device the arrangement illustrated in Fig. 21 is preferred in many cases to that illustrated in Fig. 1, and will therefore be described more particularly.

In Fig. 21 the member 9 is seen to carry the teeth 309 illustrated in Fig. 18. In order to prevent confusion in the drawing the full stroke mechanism of Fig. 18 is illustrated in Fig. 21 as located in the position occupied by the full stroke device designated by numerals 11 to 14 in Fig. 1 instead of in the position occupied by the full stroke device of Fig. 15 designated by numerals 212, 213, 215, 216 and 217, in which position the other form of device is indicated in Fig. 18. In order to operate the pawl 313 the pin 315 of Fig. 18 must now be carried in an upwardly projecting portion 351 now provided on the arm 51. Either end of the pawl 313 may be held against the teeth 309 on member 9 by means of the spring 314 depending upon the position to which the pawl has been moved in the manner to be described. Then, as in Fig. 18, when the parts are in the position shown in Fig. 21, the pawl 313 is in a position to allow the counter-clockwise rotation of member 9 induced by a downward pressure on handle 4 when at the end of this stroke of the handle the knife arm 51 is released (as described under the head "Knife operating mechanism") to spring upward under the influence of spring 64 it rocks the projection 351 around axis 3 counter-clockwise. When this occurs the pin 315 strikes pawl 313 and rocks it in a clockwise direction on its pivot 312 until spring 314 is on the side of pivot 312 opposite to that illustrated in Fig. 21. This spring holds the opposite end of the pawl 313 in contact with teeth 309 thus allowing the reverse or clockwise rotation of member 9 and the elevation of the handle 4 under the influence of spring 7. When this motion is completed the knife arm 51 is again released (as described under the head of "Knife operating mechanism") this time to spring downward rocking the projecting portion 351 clockwise. The pin 315 strikes pawl 313 and rocks it in a counter-clockwise direction on its pivot 312 to the position illustrated in Fig. 21. It will be noted, of course, that the teeth 309 and pawl 313 constitute a ratchet which permits motion of member 9 in only one direction from any point in its stroke and that this direction is changed by the operation of the knife arm 51 which takes place each time one stroke of the handle 4 and member 9 is completed. It may be noted that the pawl 313 is made in one piece and operated by a single spring for the sake of simplicity, but if desired, two separate pawls properly interlocked could be used. Furthermore instead of having the end of pawl 313 forked to receive pin 315 on arm 351 it would be equally possible to fork arm 351 to receive a pin or lug on pawl 313. In either case it should be noted that the fork is so proportioned in relation to the pin that the motion of arm 51 will just push pawl 313 till spring 314 is far enough on the opposite side of pivot 312 to give an effective pull to throw the other end of the pawl into teeth 309. There is enough play in the notch to enable the pawl 313 to snap over teeth 309 without striking the pin 315, but pin 315 prevents the pawl from lifting so far from teeth 309 that spring 314 would no longer be effective in returning it to its proper position. It therefore functions to positively prevent pawl 313 from accidentally snapping over too far and reversing the direction in which the member 9 can be moved.

*Operation of the mechanism using the full stroke device of Figures 18 and 21*

The mechanism normally stands in the position shown in Figs. 21 and 5. The first part of the operation consists in pushing the handle 4 downward to the limit of its motion, indicated by broken lines in Figs. 21 and 5. The downward motion of handle 4, to which arm 8 and member 9 are rigidly fixed, carries the feeding carriage 33 to the left end of its path, as shown in Fig. 21. During this motion the feeder 39—a drags over the surface of the paper and holds eccentrics 36 from contact therewith. The paper is not pulled backward by the feeler dragging over it because, during this stroke, the knife 42 is in its lower position so that the paper is firmly held beneath the stripper 45. During the same downward stroke of handle 4, the connecting rod 80 rocks the type frame 71, thus carrying the type from contact with the ink pad, at the beginning of the stroke, into contact with the paper at the end of the stroke, as shown by broken lines in Fig. 5. The handle 4, in its downward motion, pushes past pawl 116 (Fig. 4) thus rocking it in a counter-clockwise direction and allowing it to spring back causing the hammer 111 to strike the bell 110. During this stroke the handle 4, together with the whole of the feeding mechanism, is prevented from changing its direction of motion by the engagement of pawl 313 with the teeth 309 (Figs. 18 and 21) which are cut in member 9 (Figs. 18 and 21). The downward motion of handle 4 rocks the member 9 bringing lug 61 upward until spring 64 is in contact with arm 51, and becomes compressed between this arm and the lug 61. When, and not until, handle 4 reaches the lower limit of its motion, the adjustable screw 63 has pushed toggle link 54 far enough to break the toggle and release pawl 52 which holds the knife in its lower position. This permits the spring 64 to lift the knife operating arm 51 which carries the knife bar 44, knife 42, and stripper 45, against the tension of spring 48, to their upper position, thus releasing the paper which has been held under stripper 45. As arm 51 is moved upward by spring 64, the pin 315 carried thereby (Figs. 18 and 21) strikes pawl 313 throwing it over the dead center so that the spring holds the opposite end of the pawl in engagement with the ratchet teeth 309 in member 9 so that pawl 313 occupies the position indicated by broken lines in Fig. 21. This reverses the direction in which the handle 4 and member 9 are permitted to move thus allowing, as soon as the operator releases the handle 4, the spring 7 to return the parts to their normal positions shown in Fig. 21. Thus it is seen that the ability of the feeding mechanism, together with the handle 4, to reverse its movement is absolutely dependent upon the operation of the cutting mechanism. This positively prevents a failure in the proper functioning of the mechanism such as might otherwise be caused by failure of the operator to push the handle 4 to the absolute limit of its motion, thereby failing to break the toggle and release the cutting mechanism so that it will lift the knife and permit egress of the printed transfer, on the return stroke of the feeding mechanism.

On the return stroke the type are returned to contact with the ink pad, and the handle 4 likewise carries with it all of the parts of the feeding mechanism. As the carriage 33 moves from left to right in Fig. 21, the feeler 39—a drags over the paper until it encounters one of the holes in the strip. The feeler then drops into the hole in the paper and thereby allows the eccentrics 36 (Fig. 6) to rock under the influence of springs 37 and clamp the paper between themselves and the top plate 34 of the carriage 33. During the remainder of its motion the carriage 33 carries the paper strip with it until, at the end of its stroke the hole in the strip is under the knife 42 which is then released by the screw 62 striking link 54 and breaking the toggle which operates in the same manner as before to release the knife, which is pulled downward to cut the paper by means of the spring 48. The operation of the cutting mechanism, involving the downward motion of arm 51, causes pin 315 thereon to strike pawl 313 throwing it back to the position shown in Figs. 18 and 21 where it will permit another operation of the machine to begin. Failure, from any cause, of the cutting mechanism to operate will prevent another operation of the machine (which might cause trouble because the transfer which has been fed out of the machine and is otherwise ready for the passenger would still be attached to the strip within the machine, or because the stripper 45 would not be in a position to hold the strip against retraction) until the handle 4 is allowed to complete its motion and break the toggle, thus permitting the cutting mechanism to operate and sever the completed transfer from the strip.

It is thus seen that the cutting mechanism is held from operation, in either direction, by the toggle latch until the feeding mechanism has reached the end of its stroke, and the opposite stroke of the feeding mechanism is positively prevented until the cutting mechanism has functioned. The feeding mechanism, operated directly by the handle 4, and the cutting mechanism, operated entirely by springs (64 and 48), are mutually interlocked so that neither can operate until the other has completed its operation, the same control being exercised by operation of each mechanism in each direction.

Modified forms of roll renewing device

While I prefer to provide for attaching the beginning of the paper on a new roll to the end of the paper on the old roll by forming tongues on the end of the paper inside of the old roll and punching holes in the beginning of the paper on the outside of the new roll, it would easily be possible to use tongues formed on the end of the strip on the outside of the roll and holes in the end of the strip inside the roll, by providing means for raising the tongues from the paper from which they are formed. This could be done by placing the end of the new strip, with the tongues formed thereon, in the curved end of slot 25, (see Figs. 1 and 13) in which case the curve of the slot 25 would cause the tongues to project from the, naturally but slightly curled, paper just as tongues 130 are shown projecting in Fig. 13, but with their points pointed toward the right. In this case the roller 24 should be located below the entrance to slot 25 and the paper from the old roll would be brought through slot 25 below the end of the paper from the new roll, and when the holes came to the tongues they would pull onto the tongues and a joint like that in Fig. 11, but opposite, would be made.

Although I prefer to use tongues and holes it would be possible to provide other styles of attaching means, as for example, the end of the paper bent back on itself and secured by paste, or otherwise; or metal clips, or any of various other devices might be used.

Other modifications

It is not absolutely necessary that the date be printed by my machine because pre-dated blanks could be used. Such blanks with either the complete date, or simply the day of the month already printed thereon are now frequently used in connection with punched transfers. If such blanks were used it would only be necessary for my machine to print the time of day, and other information which it is necessary to change during the day. Although it is possible to use such pre-dated blanks in my machine it is not necessary or advisable with my machine, because they are simply an added inconvenience and expense developed in the attempt to overcome as far as possible the disadvantages of a punched transfer by providing as far as possible the legible markings which are completely provided by my machine.

I have said that all the printing which is uniform, or alike, on all transfers has already been done on the blanks which I provide for use in my machine. Conditions and requirements of transfer systems in various localities are so different that the exact meaning of the phrase "alike on all transfers" will also be subject to equally great variation. In some cases the blanks used for all transfers in a whole city may be printed alike, in other cases different forms of printed blanks may be used on each route or on the same route at different times. However, with any given local situation, and the transfer system adapted thereto, I believe the meaning will always be sufficiently clear. Sometimes "all transfers" may mean all transfers issued by one company, or in one city, in which case my machine may be required to print the name or number of the route designation of the car from which the transfer is issued. The possibility of stamping such additional information on the transfer has already been described. In some cases "all transfers" may mean all transfers issued from one line or subdivision, which may comprise several distinct routes, designations for which will then have to be printed by my machine. In most cases, where the street car and transfer systems are not too complicated, "all transfers" will probably mean all transfers issued from the cars on one line or route, because this avoids, on the one hand, an inconveniently large number of printed forms, and on the other hand, the printing of the route designation by my machine, and permits of the commonly used expedient of indicating different routes by different colors of paper in the transfers issued from cars of that route, thus making the route designation conspicuous and still keeping the amount of printing done by my machine as little as possible so as to make the information given thereby as conspicuous as possible. In case the pre-dated blanks above described are used "all transfers" will mean only the transfers issued by one of the subdivisions above described, on one particular day. These are just a few of the many possible examples found in varying local systems. The term "all transfers" as used in these specifications and claims, however, should be understood to means all transfers issued from one or more cars during one or more trips over the same or different routes, i. e. a variable number issued successively by one or more of my machines. Thus "all transfers" will usually mean a number sufficiently large to justify a specially printed form, and yet not so inclusive as to leave too many designations to be stamped on by my machine, thus tending to unduly increase the difficulty of ascertaining the information necessary to determine the validity of the transfer.

Although I have shown a toggle for holding the knife from movement until the motion of the feeding mechanism is completed, there are other means well known in the art by which this movement of the knife (under the influence of the springs which operate it in each direction) could be prevented until the feeding mechanism completes its motion in either direction.

Although I have only mentioned a few variations and modifications in the construction of various parts of my device, and only a few of the many possible arrangements of information on the finished transfers which may be issued thereby, I do not desire to be understood as limiting the invention to the specific forms illustrated, as many other modifications could be made by those skilled in the art within the scope of the appended claims.

What I claim is:—

1. In combination: a paper feeding mechanism having a forward and return stroke at each operation thereof; a cutting mechanism adapted to be operated alternately in opposite directions by oppositely directed springs; a detent for preventing operation of said cutting mechanism while said feeding mechanism is intermediate the ends of its stroke in either direction; and means whereby the feeding mechanism, when it reaches the end of its stroke in either direction, releases said cutting mechanism from said detent, thus permitting it to operate in one direction under the influence of one spring when the feeding mechanism is at the end of its forward stroke and in the other direction under the influence of the other spring when the feeding mechanism is at the end of its return stroke.

2. In combination: a paper feeding mechanism having a forward and return strokes at each operation thereof; a spring operated cutting device actuated by power derived from the operation of said feeding mechanism; means, controlled by parts associated with said feeding mechanism, for causing said cutting device to operate in one direction at the completion of one stroke and in the other direction at the completion of the other stroke of said feeding mechanism; and means connected with said cutting device for holding the paper during the idle stroke of said feeding mechanism.

3. In a transfer dispensing machine: a reciprocating feeding mechanism; a vertically reciprocating cutting mechanism for severing transfers; a spring which normally tends to hold said cutting mechanism in its depressed position; a second spring, sufficient to raise said cutting mechanism against the tension of said depressing spring; means for bringing said second spring into play before said cutting mechanism is to be lifted; a toggle adapted to hold said cutting mechanism in either its raised or depressed position against the tension of either spring; and means, controlled by parts associated with said feeding mechanism, for breaking said toggle, thus allowing the proper spring to operate the cutting mechanism in one direction, at the completion of one stroke and in the other direction at the completion of the other stroke of said feeding mechanism.

4. In a transfer machine: a reciprocating feeding mechanism; a knife for severing transfers; oppositely directed springs for operating the knife in opposite directions; means for holding the knife in the position to which it has last operated; and means for releasing the knife and causing said springs to operate it in opposite directions by turns, as said feeding mechanism is successively brought to the opposite ends of its stroke.

5. In a transfer machine: a reciprocating feeding mechanism; a cutting device having an up and down movement for severing transfers; oppositely directed springs to operate the cutting device in opposite directions; means for applying power from said feeding mechanism to said cutting device through one of said springs at one end of one stroke of said feeding mechanism; means for causing said springs to exert oppositely directed pressures on said cutting device when said feeding mechanism is at opposite ends of its stroke; a toggle adapted to hold said cutting device in its raised or depressed position; and means for breaking the toggle to release the cutting device when said feeding mechanism reaches either end of its stroke.

6. In a transfer machine: a reciprocating feeding mechanism for a paper web having spaced perforations throughout its length; a control member mounted thereon, adapted to enter perforations in the web and thereby control the feeding operation, and adapted to drag over the surface of the paper on the idle stroke of said feeding mechanism; means for severing the transfers fed out by said feeding mechanism; a stripper yieldingly connected therewith for stripping the paper therefrom; and means for holding said severing means in a position to cause said stripper to hold the paper while said control member is dragging over it.

7. In a transfer machine: a reciprocating operating handle; reciprocating paper feeding means; a direct connection therebetween for causing said two elements to operate in unison; means for cutting the paper fed by said feeding means; and means for causing said cutting means to operate in one direction at the completion of the idle stroke, and in the other direction at the completion of the feeding stroke of said feeding means.

8. In a transfer machine: mechanism for feeding paper from a web having spaced perforations throughout its length; a control member adapted to enter perforations in the web and thereby determine the length of paper to be fed out at each feeding operation; and grippers, controlled by said member for applying to the paper all of the tractive force required to perform the feeding operation.

9. In a transfer machine: reciprocating mechanism for feeding paper from a web having spaced perforations throughout its length; a control member adapted to enter perforations in the web and thereby determine the length of paper to be fed out at each feeding operation; grippers, controlled by said member, for applying to the paper all of the tractive force required to perform the feeding operation; cutting mechanism for severing transfers fed out by said feeding mechanism; and a clamping member carried by said cutting mechanism, and adapted to hold the paper against retraction during the idle stroke of said feeding mechanism.

10. In a transfer machine: means for grasping and feeding a strip of paper from which transfers are to be formed from a supply; means for severing transfers from the strip which means carries a member adapted to hold the paper against retraction; and a feeler adapted to enter holes in the strip and determine the length of paper fed from said supply by said grasping and feeding means.

11. In a transfer machine: reciprocating means for feeding a strip of blanks from which transfers are to be formed from a supply; a reciprocating knife for severing transfers from the strip; a member yieldingly connected with said knife and adapted to hold the paper strip during the cutting operation and during the idle stroke of said reciprocating means and to strip the paper from said knife as it is withdrawn from the paper and a feeler adapted to enter holes in the strip, and cause said feeding means to grasp the paper at such a point that the space between the blanks will be brought under said knife.

12. In combination: a reciprocating paper feeding means; a spring operated cutting mechanism adapted to be released for operation by the feeding means as it reaches the end of its stroke; means for preventing the operation of said feeding means in more than one direction from any point in its stroke; and means whereby the operation of said cutting mechanism causes said preventing means to reverse the direction of its effectiveness.

13. In combination: a reciprocating paper feeding means; a spring operated cutting mechanism adapted to be released for operation by the feeding means as it reaches the end of its stroke; a ratchet for preventing the operation of said feeding means in more than one direction from any point in its stroke; and means whereby operation of said cutting mechanism changes the direction in which said ratchet is effective.

14. In combination: a reciprocating, spring returned, operating handle; reciprocating paper feeding means directly connected thereto; a cutting mechanism, normally held against operation by a detent, but adapted to be released for operation by said feeding means as it reaches the end of its return stroke; and an air dash pot for preventing excessive speed on said return stroke, said dash pot having a larger internal diameter near the closed end thereof in order to prevent it from interfering with the action which said feeding means exerts at the completion of its return stroke, to release said cutting mechanism.

15. In combination: a paper feeding means directly connected to a reciprocating operating handle, having a manually operated forward stroke and spring operated return stroke at each operation; a movable paper cutting device; means whereby the completion of the spring operated stroke causes said cutting device to operate; an air dash pot for preventing excessive speed in the return stroke, said dash pot being designed to prevent it from excessively checking the speed at the end of the stroke and thus preventing the operation of said cutting device.

16. In a transfer machine: a reciprocating feeding mechanism; a knife for severing transfers; oppositely directed springs for operating the knife in opposite directions; means for holding the knife in the position to which it has last operated; means for releasing the knife and causing said springs to operate it in opposite directions by turns, as said feeding mechanism is successively brought to the opposite ends of its stroke; type for printing on transfer blanks; a pad for inking the type; a platen for supporting a blank to be printed; and means for causing, alternately, a spring-impressed contact of the type with said ink pad and with a blank supported by said platen.

17. In a transfer machine: means for grasping and feeding a strip of paper, from which transfers are to be formed, from a supply strip; means for severing transfers from the strip, which means carries a member adapted to hold the strip against retraction; a feeler adapted to enter the holes in the strip to determine the length of paper fed from the supply by said grasping and feeding means; type for printing on transfer blanks; a platen for supporting a blank to be printed; an inking pad against which the type normally rest; and means for removing the type in a direction substantially normal to the surface of the inking pad, bringing them into substantially normal contact with the blank to be printed, and returning them into substantially normal contact with the inking pad, during each operation of the machine.

18. In a transfer machine: a reciprocating operating handle; reciprocating paper feeding means; a direct connection therebetween for causing said two elements to operate in unison; type for printing on transfer blanks; a frame on which said type are mounted; an ink pad; a platen for supporting a blank to be printed; a link and lever mechanism connecting said type frame with said operating handle, and adapted to bring the type into contact with a blank resting on said platen when said handle reaches one end of its stroke, and into contact with said ink pad when said handle reaches the other end of its stroke; means for cutting the paper fed and printed by said feeding means and said printing means; and means for causing said cutting means to operate at the completion of the feeding stroke of said feeding means.

19. In a transfer machine: a reciprocating mechanism for grasping and feeding forward a paper web having spaced printed blanks and correspondingly spaced perforations throughout its length; type for printing on transfer blanks; a frame on which said type are mounted; an inking device; a platen for supporting a blank to be printed; a link and lever mechanism for operatively connecting said type frame with a moving part of said feeding mechanism; a member mounted on said feeding mechanism and adapted to cooperate with perforations in the paper web to cause said feeding mechanism to grasp the paper at a point in its stroke which will cause it to feed the paper to such a point that the printing done by said type will register with the printed blanks.

20. In a transfer machine: a reciprocating mechanism for grasping and feeding forward a paper web having spaced printed blanks and correspondingly spaced perforations throughout its length; type for printing on transfer blanks; a frame on which said type are mounted; an inking device; a platen for supporting a blank to be printed; a link and lever mechanism for operatively connecting said type frame with a moving part of said feeding mechanism; a cutting device adapted to operate at the completion of the feeding stroke of said feeding mechanism; a member mounted on said feeding mechanism and adapted to co-operate with perforations in the paper web to cause said feeding mechanism to grasp the paper at a point in its stroke which will cause it to feed the paper to such a point that the printing done by said type will register with the printed blanks and the cutting device will cut the paper web in the space between successive blanks.

21. In a transfer machine: a reciprocating operating handle; reciprocating mechanism for grasping and feeding forward a paper web having spaced printed blanks and correspondingly spaced perforations throughout its length; a direct connection therebetween for causing said two elements to operate in unison; type for printing on transfer blanks; a frame on which said type are mounted; an inking device; a platen for supporting a blank to be printed; a link and lever mechanism for operatively connecting said type frame with said operating handle; a cutting device adapted to operate at the completion of the feeding stroke of said feeding mechanism and operating handle: a member mounted on said feeding mechanism and adapted to co-operate with perforations in the paper web to cause said feeding mechanism to grasp the paper at a point in its stroke which will cause it to feed the paper to such a point that the printing done by said type will register with the printed blanks and the cutting device will cut the paper web in the space between successive blanks.

22. In a transfer machine: a reciprocating operating handle; a reciprocating paper feeding means; a direct connection therebetween for causing said two elements to operate in unison; a spring operated cutting device for severing transfers; a detent for preventing operation of said cutting device during the feeding stroke of said feeding means; means whereby completion of the feeding stroke releases said cutting device from said detent; type for printing on transfer blanks; a frame on which said type are mounted; an ink pad; a platen for supporting a blank to be printed; a link and lever mechanism connecting said type frame with said operating handle in such a manner that on one stroke of said operating handle the type are carried from contact with said ink pad into contact with a blank on said platen, and on the other stroke of said operating handle the type are carried from contact with a blank on said platen back into contact with said ink pad; and a lost motion connection where said mechanism is connected to said operating handle, so arranged that when said type come into contact with said ink pad their motion is arrested while the handle and feeding mechanism are permitted to complete their return stroke.

23. In a transfer machine: a reciprocating operating handle; a reciprocating paper feeding mechanism; a direct connection therebetween for causing said two elements to operate in unison; a cutting mechanism adapted to be operated alternately in opposite directions by oppositely directed springs; a detent for preventing operation of said cutting mechanism while said feeding mechanism is intermediate the ends of its stroke in either direction; means whereby the feeding mechanism, when it reaches the end of its stroke in either direction releases said cutting mechanism from said detent, thus permitting it to operate in one direction under the influence of one spring when the feeding mechanism reaches the end of its forward stroke, and in the other direction under the influence of the other spring when the feeding mechanism reaches the end of its return stroke; type for printing on transfer blanks; a frame on which said type are mounted; an ink pad; a platen for supporting a blank to be printed; a link and lever mechanism connecting said type frame with said operating handle, and adapted to bring said type into contact with a blank supported by said platen when said handle reaches one end of its stroke and into contact with said ink pad when said handle reaches the other end of its stroke; a yielding element in said link and lever mechanism to permit the operating handle to complete its stroke on one direction after movement of the type has been arrested by contact with the paper on the platen; and a lost motion connection between said link and lever mechanism and the operating handle to permit the handle to complete its stroke in the other direction after the type has come into contact with said ink pad.

24. In combination: a reciprocating paper feeding means; a printing mechanism; a link and lever mechanism for operatively connecting said printing mechanism with a moving part of said feeding means and causing said printing mechanism to make the impression at a time when said feeding means is at one end of its path; a spring operated cutting mechanism adapted to be released for operation by the feeding means as it reaches one end of its stroke; a ratchet for preventing the operation of said feeding means in more than one direction from any point in its stroke; and means whereby operation of said cutting mechanism changes the direction in which said ratchet is effective.

25. In a transfer machine: a reciprocating mechanism for grasping and feeding forward a paper web having spaced printed blanks and correspondingly spaced perforations throughout its length; a printing device for printing on transfer blanks; a link and lever mechanism for operatively connecting said printing device with a moving part of said feeding mechanism; a member mounted on said feeding mechanism and adapted to co-operate with perforations in the paper web to cause said feeding mechanism to grasp the paper at a point in its stroke which will cause it to feed the paper forward to such a point that the printing done by said printing device will register with the printed blanks.

26. In a transfer machine: a reciprocating feeding mechanism; a knife for severing transfers; oppositely directed springs for operating the knife in opposite directions; means for holding the knife in the position to which it has last operated; means for releasing the knife and causing said springs to operate it in opposite directions by turns as said feeding mechanism is successively brought to the opposite ends of its stroke; means for printing on transfers; and means for changing the characters which will be printed by said printing means.

27. In a transfer machine: means for grasping and feeding a strip of printed blanks from which transfers are to be formed from a supply; means for severing transfers from the strip, which means carries a member adapted to hold the paper against retraction; a printer for printing on the strip of paper from which transfers are to be formed; and a feeler adapted to enter holes in the strip and thereby cause the printing done by said printer to register with printing on the blanks, and determine the length of paper fed from said supply by said grasping and feeding means.

28. In a transfer machine: a reciprocating mechanism carrying means for grasping paper and feeding it from a web having spaced perforations throughout its length; means for printing on the paper web; and a member adapted to co-operate with perforations in the web, for controlling said grasping means and thereby locating the printing done at each operation by said printing means, in a predetermined relation to one of the perforations in the web, and causing each feeding operation to feed the paper forward the exact length of the space between successive perforations.

29. In a transfer machine: a reciprocating feeding mechanism for a paper web having spaced perforations throughout its length; a printing mechanism for printing on the paper web; and a feeler attached to said feeding mechanism and adapted to fall into the perforations in the web on the feeding stroke, thus causing the feeding mechanism to grasp the paper at that point in its stroke.

30. In a transfer machine: reciprocating mechanism carrying means for grasping paper and feeding it from a web having spaced perforations throughout its length; and a member adapted to co-operate with perforations in the web for controlling said grasping means thereby causing each feeding operation to feed the paper forward the exact length of the space between successive perforations.

31. In a transfer machine: reciprocating mechanism carrying means for grasping paper and feeding it from a web having spaced perforations throughout its length, the spaces between successive perforations being variable within predetermined limits; and a member adapted to co-operate with perforations in the web for controlling said grasping means and thereby regulating the length of each feeding operation to the length of the space between the particular perforations to be fed out.

32. In a transfer machine: a reciprocating feeding mechanism for a paper web having spaced perforations throughout its length; a feeler attached thereto and adapted to fall into the perforations in the web on its feeding stroke, causing the feeding mechanism to grasp the paper at that point in its stroke.

33. In a transfer machine: a reciprocating feeding mechanism for feeding paper from a web having spaced perforations throughout its length; co-operating members on said feeding mechanism for grasping the paper when said feeding mechanism is moving in one direction, and for releasing the paper when said feeding mechanism is moving in the opposite direction; and a member adapted to enter perforations in the web for controlling the point in the stroke where such grasping takes place.

34. In a transfer machine: a reciprocating feeding mechanism for a paper web having spaced perforations throughout its length; eccentrics and a co-operating member mounted thereon for grasping the paper when said feeding mechanism is moving in one direction; and means, co-operating with holes in the paper, for controlling the action of said eccentrics to cause them to feed out the correct length of paper during each feeding stroke of said feeding mechanism.

35. In a transfer machine: a reciprocating feeding mechanism for a paper web having spaced perforations throughout its length; eccentrics and a co-operating member mounted thereon for grasping the paper while the feeding mechanism is moving in one direction; means, co-operating with holes in the paper, governing the action of said eccentrics to control the length of paper fed out by each stroke of said feeding mechanism; and means for holding the paper stationary while the feeding mechanism is moving in the other direction.

36. In a transfer machine: reciprocating mechanism carying means for grasping paper and feeding it from a web having spaced perforations throughout its length; a member adapted to co-operate with perforations in the web, for controlling said grasping means and thereby regulating the length of each feeding operation to the length of the space between the particular perforations to be fed out; means for cutting the paper fed out by said grasping means; and a member associated therewith for holding the paper during one stroke of said reciprocating mechanism.

37. In a transfer machine: reciprocating mechanism carrying means for grasping paper and feeding it from a web having spaced perforations throughout its length, the spaces between successive perforations being variable within predetermined limits; a member, adapted to co-operate with the perforations, for controlling said grasping means and thereby regulating the length of each feeding operation to conform to variations in the lengths of the spaces between perforations; means for cutting the paper fed out by said grasping means; and a member associated therewith for stripping the paper from the cutter and for holding the paper during one stroke of said reciprocating mechanism.

38. In a transfer machine: a reciprocating feeding mechanism for a paper web having spaced perforations throughout its length; a feeler attached thereto and adapted to fall into the perforations in the web on the feeding stroke of said mechanism, thus causing said feeding mechanism to grasp the paper at that point in its stroke; means, controlled by said feeding mechanism, for cutting the paper at the completion of the feeding stroke; a member associated therewith for holding the paper during the other stroke of said feeding mechanism; and means, controlled by said cutting means, for preventing the beginning of the other stroke of said feeding mechanism until said cutting means has operated.

39. In a transfer machine: a reciprocating feeding mechanism for feeding paper from a web having spaced perforations throughout its length; co-operating members on said feeding mechanism for grasping the paper when said feeding mechanism is moving in one direction and for releasing the paper when said feeding mechanism is moving in the opposite direction; means for controlling the point in the stroke where such grasping takes place; means, controlled by said feeding mechanism, for cutting the paper at the completion of the feeding stroke; a member associated therewith for holding the paper during the other stroke of said feeding mechanism; and means, controlled by said cutting means, for preventing the beginning of the other stroke of said feeding mechanism until said cutting means has operated.

40. In a transfer machine: a reciprocating feeding mechanism for a paper web having spaced perforations throughout its length; eccentrics and a co-operating member mounted thereon for grasping the paper when said feeding mechanism is moving in one direction; and means, co-operating with holes in the paper, for controlling the action of said eccentrics to cause them to feed out the correct length of paper during each feeding stroke of said feeding mechanism; means for cutting the paper fed by said mechanism; a member associated therewith for holding the paper during the idle stroke of said mechanism.

41. In a transfer machine: a reciprocating feeding mechanism for a web having spaced perforations throughout its length; eccentrics and a co-operating member mounted thereon for grasping the paper when said feeding mechanism is moving in one direction; means for preventing said eccentrics from grasping the paper until they reach one of the holes in the paper; means, controlled by said feeding mechanism, for cutting the paper at the completion of the feeding stroke of said mechanism; and a member associated therewith for holding the paper during the idle stroke of said mechanism.

42. In a transfer machine: a reciprocating feeding mechanism for a paper web having spaced perforations throughout its length; eccentrics and a co-operation member mounted thereon for grasping the paper while the feeding mechanism is moving in one direction; means, cooperating with perforations in the paper, governing the action of said eccentrics to control the length of paper fed out by each feeding stroke of said mechanism; means, controlled by said mechanism, for cutting the paper at the completion of its feeding stroke; and a member associated therewith for holding the paper stationary while said feeding mechanism is moving in the other direction.

43. In a transfer machine: a reciprocating feeding mechanism for a paper web having spaced perforations throughout its length; eccentrics and a co-operating member mounted thereon for grasping the paper while the feeding mechanism is moving in one direction; means, co-operating with perforations in the paper, governing the action of said eccentrics to control the length of paper fed out by each feeding stroke of said mechanism; means, controlled by said mechanism, for cutting the paper at the completion of its feeding stroke; a member associated therewith for holding the paper stationary while said feeding mechanism is moving in the other direction; and means, controlled by said cutting means, for preventing the beginning of the reverse stroke of said feeding mechanism until said cutting means has operated.

FREDERICK G. L. BOYER.